United States Patent
Separautzki

[19]

[11] Patent Number: 6,148,581
[45] Date of Patent: Nov. 21, 2000

[54] INTERNAL HIGH PRESSURE FORMED NODAL CONNECTION ELEMENT FOR A FRAME CONSTRUCTION, AND METHOD OF MAKING SAME

[75] Inventor: Reinhold Separautzki, Moeglingen, Germany

[73] Assignee: Dr. Ing. h.c.F. Porsche AG, Weissach, Germany

[21] Appl. No.: 09/064,096

[22] Filed: Apr. 22, 1998

[30] Foreign Application Priority Data

Apr. 22, 1997 [DE] Germany ............... 197 16 865

[51] Int. Cl.$^7$ ................ F16S 3/08; B60D 7/00
[52] U.S. Cl. ............ 52/653.2; 52/655.1; 52/656.9; 403/205; 296/29; 296/32; 296/205; 280/785; 280/798; 29/421.1; 29/525.06; 29/469.5; 29/897.2; 29/897.3; 285/55
[58] Field of Search ............... 403/205; 296/205, 296/29, 32; 280/785, 798; 29/421.1, 523, 525.06, 469.5, 897.2, 897.3, 897.31, 897.312; 52/653.2, 655.1, 656.9; 285/55; 138/140–143, 155

[56] References Cited

U.S. PATENT DOCUMENTS

| | | |
|---|---|---|
| 1,235,671 | 8/1917 | Fay .............................. 285/555 |
| 2,370,193 | 2/1945 | Reid . |
| 2,516,698 | 7/1950 | France et al. . |
| 3,943,616 | 3/1976 | Smith et al. . |
| 4,332,073 | 6/1982 | Yoshida et al. ............ 29/421.1 |
| 4,357,745 | 11/1982 | Chebowski ............. 138/141 X |
| 4,366,971 | 1/1983 | Lula ............................. 285/55 |
| 4,377,894 | 3/1983 | Yoshida ...................... 29/421.1 |
| 4,449,281 | 5/1984 | Yoshida et al. ............. 29/421.1 |
| 4,577,664 | 3/1986 | Takahashi et al. ........... 138/143 X |
| 4,635,333 | 1/1987 | Finch . |
| 4,662,655 | 5/1987 | Fliervoet et al. .......... 285/133.3 |
| 5,143,407 | 9/1992 | Cokeh ........................ 285/55 |
| 5,265,790 | 11/1993 | Mumford et al. ............. 285/55 X |
| 5,363,544 | 11/1994 | Wells et al. . |
| 5,435,163 | 7/1995 | Schafer . |
| 5,566,721 | 10/1996 | Breese ........................ 138/145 |
| 5,673,470 | 10/1997 | Dehlinger et al. ........... 29/421.1 |
| 5,940,951 | 8/1999 | Schultz et al. .............. 29/421.1 |
| 5,954,371 | 9/1999 | Koke et al. .................. 285/555 |

FOREIGN PATENT DOCUMENTS

| | | |
|---|---|---|
| 195 06 160 | 8/1996 | Germany . |
| 282613 | 12/1927 | United Kingdom ............... 285/55 |

*Primary Examiner*—Robert Canfield
*Attorney, Agent, or Firm*—Evenson, McKeown, Edwards & Lenahan, P.L.L.C.

[57] ABSTRACT

A frame construction includes at least one nodal connection element and several tube-shaped frame elements connected thereto. The frame elements and the nodal connection elements are manufactured by hydraulic internal high pressure forming and are joined via plug-type connections. Each nodal connection element has at least two connections for adjoining frame elements. The nodal connection element consists of at least two internal-high-pressure-formed tube-shaped hollow bodies in a nested configuration. The hollow bodies are made of different materials, and have different cuts in the area of the connections—viewed in the longitudinal direction of the respective connection, allowing connection with frame elements made of corresponding different materials. In the area of each connection, one of the two hollow bodies, in addition to being connected in a plug-type connection with the adjoining frame elements made of the same material, is connected by an additional connection.

16 Claims, 3 Drawing Sheets

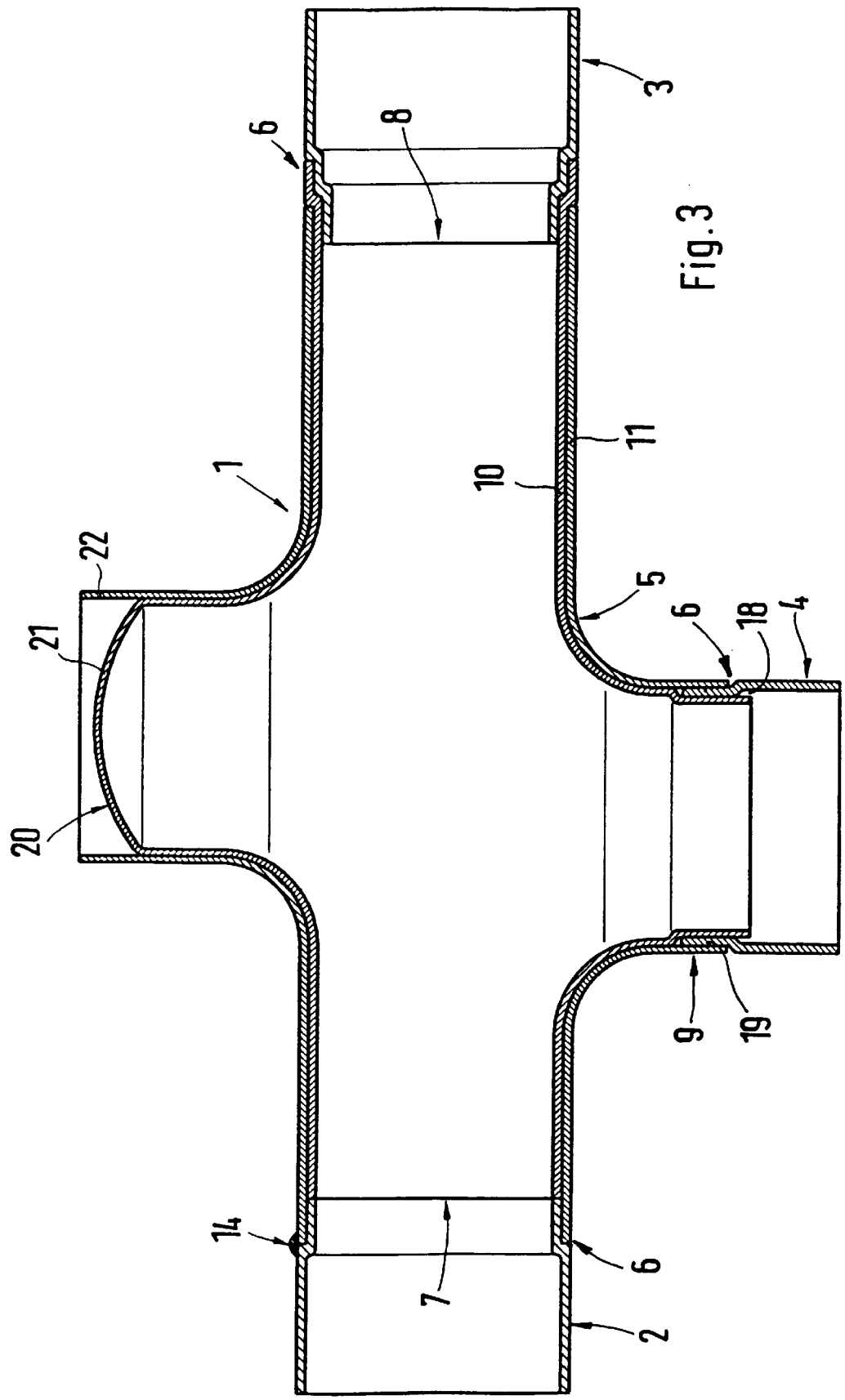

INTERNAL HIGH PRESSURE FORMED NODAL CONNECTION ELEMENT FOR A FRAME CONSTRUCTION, AND METHOD OF MAKING SAME

BACKGROUND AND SUMMARY OF THE INVENTION

This application claims the priority of German patent document 197 16 865.5, the disclosure of which is expressly incorporated by reference herein.

The invention relates to a nodal connection element formed by internal high pressure forming. The invention also relates to a frame construction which comprises at least one of the nodal connection elements and a plurality of tube-shaped frame elements. The invention also relates to the method of making such a nodal connection element and frame construction.

German Patent Document DE 195 06 160 A1 shows a frame construction for the supporting structure of a vehicle body which is composed of frame elements and nodal connection elements. In this arrangement, the frame elements as well as the nodal connection elements are produced by hydraulic internal high pressure forming of aluminum tube profiles. The frame elements are inserted into or fitted onto the adjacent nodal connection element, where the plug-type connection is additionally secured by welding, gluing, screwing or riveting. This type of frame construction is suitable only for uniform materials, but not for a mixed construction where the frame elements are made of different materials.

Thus, there is a need for a nodal connection element which is connectable with frame elements made of different materials.

This and other needs have been met according to the present invention by providing a frame construction comprising: at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections.

This and other needs have also been met according to the present invention by providing a nodal connection element comprising: an exterior tubular hollow body formed by internal high pressure forming a first material; an interior tubular hollow body formed by internal high pressure forming a second material, said second material being different from said first material, said interior tubular hollow body being nested inside said exterior tubular hollow body, said nested hollow bodies defining at least two connection openings, an end of the exterior hollow body being offset from an end of the interior hollow body at said connection openings.

This and other needs have also been met according to the present invention by providing a method of forming a nodal connection element, said method comprising the steps of: (a) internal high pressure forming an exterior tubular hollow body of a first material; (b) internal high pressure forming an interior tubular hollow body nested inside said exterior hollow body, said interior hollow body being formed of a second material which is different from said first material; and (c) cutting ends of said exterior hollow body at an offset from ends of said interior hollow body to define at least two connection openings.

The principal advantages achieved by the invention are that, due to the structure of the internal-high-pressure-formed nodal connection elements, a frame construction is permitted as a mixed construction; that is, frame elements of different materials can be connected to the respective nodal connection element. This permits material combinations, such as steel/aluminum, aluminum/steel, aluminum/magnesium, magnesium/aluminum, and the like. A frame construction of this type is particularly suitable for chassis parts and for the supporting structure of a vehicle body.

Other objects, advantages and novel features of the present invention will become apparent from the following detailed description of the invention when considered in conjunction with the accompanying drawings.

BRIEF DESCRIPTION OF THE DRAWINGS

FIG. 3 is a sectional view of a nodal connection element for a frame construction according to another preferred embodiment of the present invention.

DETAILED DESCRIPTION OF THE DRAWINGS

Figure 1:
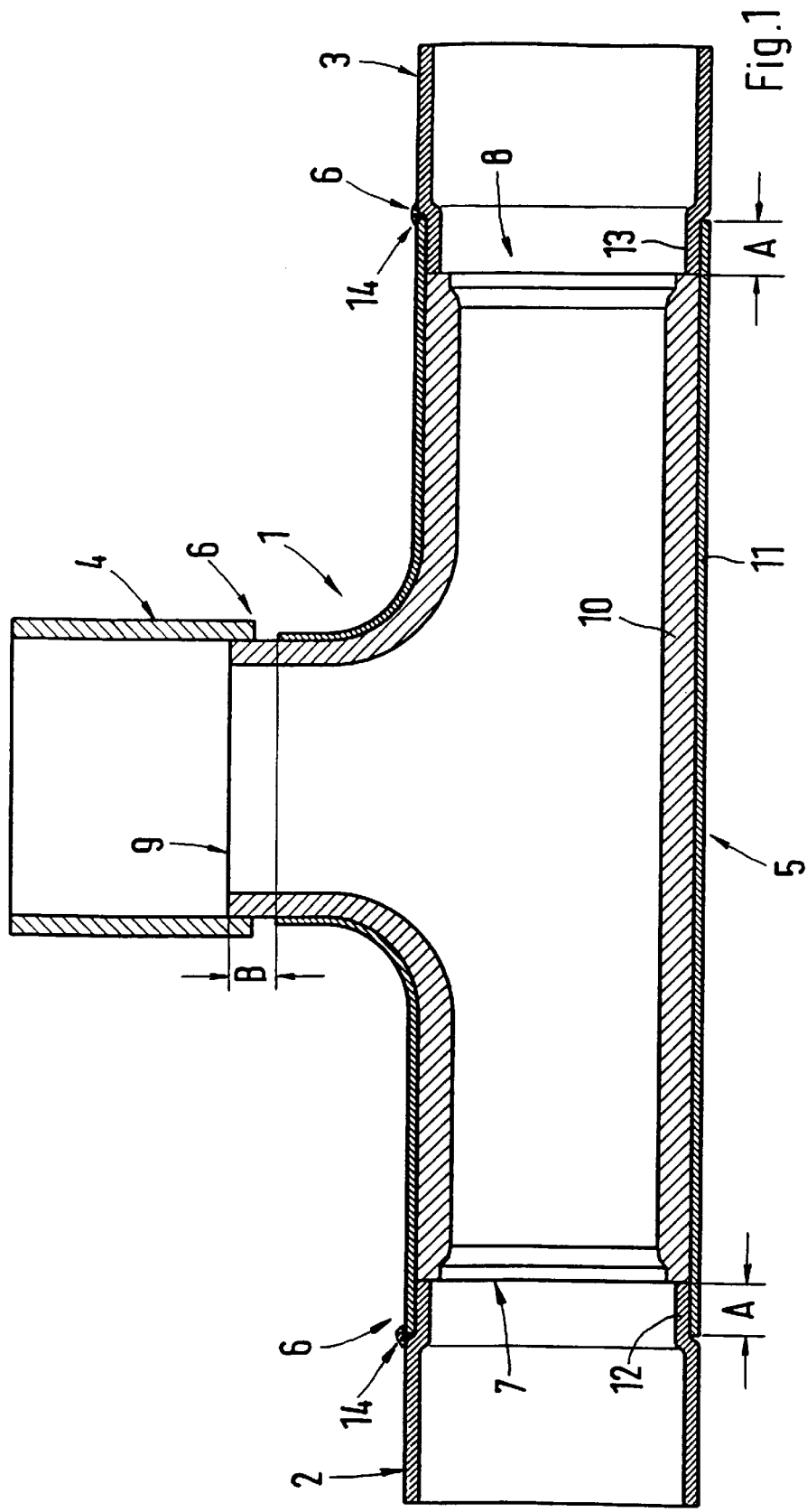
FIG. 1 is a sectional view of a nodal connection element for a frame construction according to a preferred embodiment of the present invention.
Figure 2:
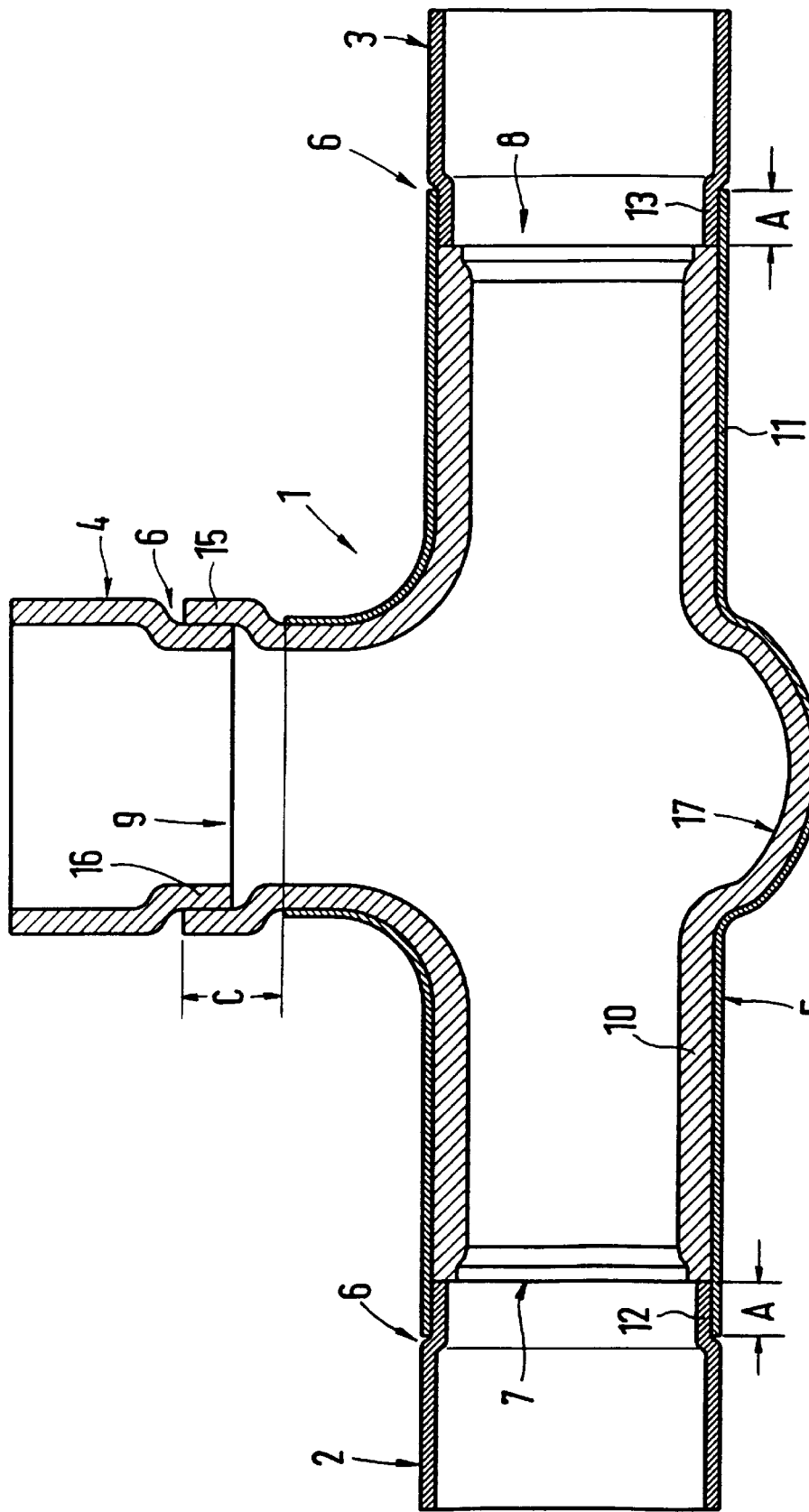
FIG. 2 is a sectional view of a nodal connection element for a frame construction according to another preferred embodiment of the present invention.

Referring to FIGS. 1–3, a frame construction 1 comprises several tube-shaped frame elements 2, 3, 4 and one nodal connection element 5. The frame elements 2, 3, 4 and the nodal connection element 5 are each produced by hydraulic internal high pressure forming and are joined by means of plug-type connections 6 (i.e., smaller diameter sections which plug into larger diameter sections).

In the illustrated embodiments, the nodal connection element 5 in each case has three connections 7, 8, 9 for the adjoining frame elements 2, 3, 4. Connections 7 and 8 are defined as axial connections, and connection 9 is defined as a radial connection. Although the branch forming connection 9 is shown extending perpendicular to the branches forming connections 7 and 8, the branches may extend at other angles to each other, depending upon the required application.

According to the invention, the nodal connection element 5 consists of at least two mutually inserted (i.e., nested) tube-shaped hollow bodies 10, 11 made from different materials. The two internal-high-pressure-formed hollow bodies 10, 11 of the nodal connection element 5 have different cuts in the area of the connections 7, 8, 9—in each case, viewed in the longitudinal direction of the connection, such that one of the hollow bodies projects beyond the other hollow body as denoted by measurements A, B, C.

In the area of the connection 7, 8, 9, one of the two hollow bodies 10 and 11 is connected with the adjoining identical-material frame element 2, 3, 4 by the plug-type connection 6 and by an additional welded connection. In FIGS. 1 to 3, the interior hollow body 10 is in each case made of aluminum or of an aluminum alloy, whereas the exterior hollow body 11 consists of steel. The wall thickness of the interior hollow body 10 may be the same, thicker or thinner than the wall thickness of the exterior hollow body 11. The material pairing may also be in reverse. Additional pairings of materials aluminum/magnesium, magnesium/aluminum or others are contemplated.

In FIGS. 1 and 2, frame elements 2, 3 made of steel are in each case connected to the nodal connection element 5 in the area of the axial connections 7, 8, whereas a frame element 4 made of aluminum or of an aluminum alloy is connected to the radial connection 9.

In the area of the axial connections 7, 8, the exterior hollow body 11 made of steel projects more than the interior hollow body 20 made of aluminum (measurement A). A recessed end area 12, 13 of the adjoining frame element 2, 3 is fitted in sections into the projecting area of the exterior hollow body 11, in which case, in the transition area of the exterior hollow body 11 and the recessed end area 12, 13 of the frame element 2, 3, an additional welded connection 14 takes place on the exterior side. It is also contemplated to provide, instead of the welded connection 14, a connection by means of gluing, screwing, riveting or the like. The recessed end area 12, 13 rests with or without an axial gap against the free end of the interior hollow body 10.

In FIG. 1, the interior hollow body 10 in the area of the third connection 9 projects over the exterior hollow body 11 by an extent B. The frame element 4 of the same material as the interior hollow body 10 is fitted on the exterior side on the projecting area of the interior hollow body 10. Also, an additional welded connection can take place on the exterior side.

In FIG. 2, in the area of the third connection 9, the interior hollow body 10 projects over the exterior hollow body 11 by the extent C. In the case of this variant, the interior hollow body 10 has an outwardly directed widening 15 on the edge side, into which an inwardly recessed end area 16 of the adjacent frame element 4 is inserted. Also in this case, an additional exterior-side welded connection is provided between the interior hollow body 10 and the frame element 4. In FIG. 2, opposite the radial connection 9, an outwardly directed bulging-out 17 is provided locally on the nodal connection element on the two mutually fitted-in hollow bodies 10, 11 of the nodal connection element 5 for improving the form closure.

In FIG. 3, a frame element 2 made of steel is connected to the axial connection 7, and a frame element 3 made of aluminum is connected to the other axial connection 8. The radial lower connection 9 comprises a frame part 4 made of steel.

In the area of the radial connection 9, a ring gap 18 is defined by the nodal connection element 6 between the interior hollow body 10 and the exterior hollow body 11 into which an inwardly recessed end area 19 of the adjoining frame element 4 can be inserted. The frame element 4 is locally welded to the exterior hollow body 11 made of the same material.

In addition, on the side opposite the radial connection 9, the nodal connection element 5 has a molded-on section 20 as a reinforcement, the interior hollow body 10 having a closed outer contour 21. The exterior hollow body 11 projects over the closed outer contour 21 of the interior hollow body 10 in sections in the upward direction (projecting collar 22).

The illustrated frame construction 1 is preferably suitable for chassis parts and particularly for the carrying structure of a vehicle body. In addition, other applications are also contemplated.

The interior and the exterior hollow body 10, 11 of the nodal connection element 5 can be internal-high-pressure-formed jointly or successively. In order to form the interior and exterior hollow bodies jointly, tubular blanks for each of the interior and exterior hollow bodies are placed in the internal-high-pressure mold at the same time, with the blank for forming the interior hollow body being nested inside of the blank for forming the exterior hollow body, and then high pressure is admitted into the interior of the nested blanks to form the internal and external hollow bodies simultaneously. In order to form the interior and exterior hollow bodies successively, a tubular blank for the exterior hollow body is placed in the internal-high-pressure mold first, and then high pressure is admitted into the interior of the blank to form the exterior hollow body. Subsequently, a tubular blank for the interior hollow body is placed in the internal-high-pressure mold which already contains the formed exterior hollow body, and then high pressure is admitted into the interior of the blank to form the interior hollow body. In either case, the ends of the interior and exterior hollow bodies are subsequently cut at an offset from each other to form the plug-type connections.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body supporting structure frame construction comprising:

at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections, wherein the interior hollow body projects farther in the area of one of the connections than the exterior hollow body, and an edge area of the adjoining frame elements is pluggably connected with the projecting area of the interior hollow body, and interior hollow body being fixedly connected with the frame element by welding, gluing, or riveting.

2. A frame construction according to claim 1, wherein the interior hollow body is made of aluminum or an aluminum alloy and the exterior hollow body is made of steel.

3. A frame construction according to claim 1, wherein the interior hollow body is made of steel and the exterior hollow body is made of aluminum or an aluminum alloy.

4. A frame construction according to claim 1, wherein the interior hollow body is made of aluminum or an aluminum alloy and the exterior hollow body is made of magnesium or a magnesium alloy.

5. A frame construction according to claim 1, wherein the interior hollow body is made of magnesium or a magnesium alloy and the exterior hollow body is made of aluminum or an aluminum alloy.

6. A frame construction according to claim 1, wherein the exterior hollow body projects farther in the area of one of the connections than the interior hollow body, and the exterior hollow body is fixedly connected with a plugged-in recessed end area of the adjoining frame element by welding, gluing, or riveting.

7. A vehicle body supporting structure frame construction comprising:
- at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and
- at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections,
- wherein a ring gap is defined between the interior hollow body and the exterior hollow body, a recessed end area of the frame element being insertable into the ring gap, the frame element being connected with the exterior hollow body by welding, gluing, or riveting.

8. A vehicle body supporting structure frame construction comprising:
- at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and
- at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections,
- wherein the nodal element has a molded-on reinforcing section intermediate the connections for the frame elements, the internal hollow body of the nodal element in the are of the molded-on section having a closed outer contour while the exterior hollow body has a projecting collar.

9. A vehicle body supporting structure frame construction comprising:
- at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and
- at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections,
- wherein the nodal element has a molded-on reinforcing section intermediate the connections for the frame elements, the internal hollow body of the nodal element in the area of the molded-on section having a closed outer contour while the exterior hollow body has a projecting collar.

10. A method of forming a vehicle body supporting structure, said method comprising the steps of:
- (a) internal high pressure forming an exterior tubular hollow body of a first material;
- (b) internal high pressure forming an interior tubular hollow body nested inside said exterior hollow body, said interior hollow body being formed of a second material which is different from said first material;
- (c) cutting ends of said exterior hollow body at an offset from ends of said interior hollow body to define at least two connection openings; and
- (d) connecting respective tube-shaped vehicle frame elements at the connection openings.

11. A method according to claim 10, wherein steps (a) and (b) are conducted simultaneously.

12. A method according to claim 10, wherein step (b) is conducted subsequent to step (a).

13. A frame construction comprising:
- at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and
- at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections,
- wherein the interior hollow body projects farther in the area of one of the connections than the exterior hollow body, and an edge area of the adjoining frame element is pluggably connected with the projecting area of the interior hollow body, the interior hollow body being fixedly connected with the frame element by welding, gluing, or riveting.

14. A frame construction comprising:
- at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and
- at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections,
- wherein a ring gap is defined between the interior hollow body and the exterior hollow body, a recessed end area of the frame element being insertable into the ring gap, the frame element being connected with the exterior hollow body by welding, gluing, or riveting.

15. A frame construction comprising:
- at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and
- at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections,
- wherein the nodal element further comprises a bulging-out intermediate the connections, the bulging-out being provided on both of said hollow bodies.

16. A frame construction comprising:
- at least one nodal connection element manufactured by hydraulic internal high pressure forming, the nodal connection element comprising at least two tube-shaped hollow bodies made of different materials, the hollow bodies being nested to define an interior hollow body and an exterior hollow body, the nodal connection element defining at least two connections at which an end of one of the tube-shaped hollow bodies is offset from an end of another of the tube-shaped hollow bodies; and
- at least two tube-shaped frame elements manufactured by hydraulic internal high pressure forming, each of said frame elements being made of one of said materials, each of said frame elements being pluggably connected with said nodal connection element at a respective of said connections, each of said frame elements being additionally joined to a respective one of said hollow bodies made of the same of said materials at said connections,
- wherein the nodal element has a molded-on reinforcing section intermediate the connections for the frame elements, the internal hollow body of the nodal element in the area of the molded-on section having a closed outer contour while the exterior hollow body has a projecting collar.

* * * * *